Patented Apr. 15, 1924.

1,490,769

UNITED STATES PATENT OFFICE.

CAMILLE DEGUIDE, OF ENGHIEN, FRANCE.

CONTINUOUS PROCESS FOR THE MANUFACTURE OF BARIUM HYDROXIDE.

No Drawing.   Application filed December 24, 1921. Serial No. 524,694.

*To all whom it may concern:*

Be it known that I, CAMILLE DEGUIDE, a subject of the King of Belgium, and a resident of Enghien, Seine and Oise, France, have invented new and useful Improvements in a Continuous Process for the Manufacture of Barium Hydroxide, of which the following is a specification.

This invention relates to the manufacture of barium hydroxide.

There has already been described in the United States Letters Patent No. 1,247,510, patented November 20, 1917, a continuous process for the production of barium hydroxide, consisting in decomposing bibarytic silicate by means of water, so as to obtain barium hydroxide and monobarytic silicate, treating the latter with barium carbonate so as to regenerate the bibarytic silicate, again treating the latter with water so as to obtain barium hydroxide and monobarytic silicate, and continuously repeating the same cycle of operations.

The applicant has found that an improved industrial yield can be obtained by decomposing with water, not the bibarytic silicate ($SiO_2.2BaO$), but the tribarytic silicate ($SiO_2.3BaO$), or a silicate intermediate between the bibarytic and the tribarytic silicates.

There is thus in effect obtained, upon decomposition by water, for example in the case of the tribarytic silicate, the following reaction:

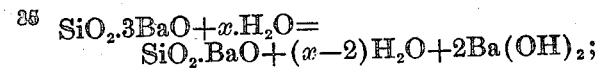

$SiO_2.3BaO + x.H_2O =$
  $SiO_2.BaO + (x-2)H_2O + 2Ba(OH)_2$;

whereas in the process according to the patent mentioned above, the reaction is as follows:—

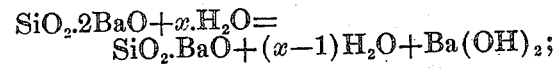

$SiO_2.2BaO + x.H_2O =$
  $SiO_2.BaO + (x-1)H_2O + Ba(OH)_2$;

the yield of barium hydroxide is therefore doubled.

In case of the decomposition of a barium silicate intermediate between this bibarytic and the tribarytic silicates, there is similarly obtained a yield of barium hydroxide varying between one and two molecular proportions.

The tribarytic silicate, from which the reaction starts, is formed by calcining silica and barium carbonate, as in the patent specification mentioned; but instead of employing for each molecule of silica two molecules of barium carbonate, there are used three of the latter, in accordance with the following reaction:

$SiO_2 + 3BaCO_3 = SiO_2.3BaO + 3CO_2$.

In case it is desired to obtain a barium silicate intermediate between the bibarytic and the tribarytic silicates, proportions of barium carbonate are selected lying between two and three molecules of carbonate to each molecule of silica.

In the course of the continuous process, the tribarytic silicate is constantly regenerated (like the bibarytic silicate in the case of the prior process mentioned), starting from the monobarytic silicate obtained, by treating this substance in a rotary furnace with barium carbonate, after stirring and mixing intimately with the latter, at 1300–1400–1500° C.; but in this case there are employed for each molecule of monobarytic silicate, two molecules of barium carbonate instead of only one:

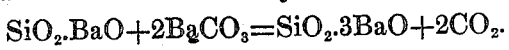

$SiO_2.BaO + 2BaCO_3 = SiO_2.3BaO + 2CO_2$.

It should be noted that whereas when the bi-barytic silicate is used, it is necessary to finely pulverize it before treating it with water, when using the tri-barytic silicate it is sufficient to treat with warm water without any pulverizing step. Barytic silicates more basic than the bi-barytic seem to be adsorbent of water and pulverize to an impalpable powder upon contact with water without previous pulverization.

The applicant has not yet been able to determine exactly whether the tribarytic silicate is a true chemical compound or a mere mixture of bibarytic silicate and barium oxide, but it is supposed that a fraction of BaO does not combine with the silica ($SiO_2$) and that it is this BaO which makes the barytic silicates more basic than the bibarytic very adsorbent of water.

Tribarytic silicate, as well as the silicates intermediate between the latter and bibarytic silicate, although more readily fusible than bibarytic silicate, is nevertheless sufficiently infusible at the temperature of decomposition of barium carbonate for it to be possible to carry out the process according to this invention on an industrial scale without any difficulty, in the rotary furnace or tunnel furnace, as in the case of starting from bi-barytic silicate.

It is not possible to increase the proportion of barium carbonate reacting with the silica or with the monobarytic silicate; this proportion must be as a maximum that giving rise to the formation of the product corresponding to the formula of tribarytic silicate ($SiO_2.3BaO$); beyond this proportion there would be obtained a silicate of barium which would be too readily fusible and would attack the walls of the furnace.

I use the expression tribarytic silicate in a sense sufficiently comprehensive to include not only a product having a chemical composition $SiO_2.3BaO$, but also intermediate products between bi- and tri-barytic silicate.

Having now particularly described and ascertained the nature of my said invention and in what manner the same is to be performed, I declare that what I claim is:—

1. In a process for the production of barium hydroxide, the step of decomposing tri-barytic silicate by water.

2. A cyclic process for the production of barium hydroxide, which consists in decomposing tri-barytic silicate to obtain mono-barytic silicate and barium hydroxide, regenerating tri-barytic silicate by reacting barium carbonate with the mono-barytic silicate to produce thus in a cyclic process further barium hydroxide and mono-barytic silicate.

In testimony whereof I have signed my name to this specification.

CAMILLE DEGUIDE.

Witnesses:
S. ANNENGAUDAMI,
M. WEFÉVRIMONT.